United States Patent
Schmauder

(10) Patent No.: US 10,307,875 B2
(45) Date of Patent: Jun. 4, 2019

(54) PALLET CHANGER AND METHOD FOR PROCESSING A SHEET-LIKE MATERIAL ARRANGED ON A MOVEABLE PALLET

(71) Applicant: TRUMPF Werkzeugmaschinen GmbH + Co. KG, Ditzingen (DE)

(72) Inventor: Frank Schmauder, Metzingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 0 days.

(21) Appl. No.: 15/710,331

(22) Filed: Sep. 20, 2017

(65) Prior Publication Data
US 2018/0079041 A1    Mar. 22, 2018

(30) Foreign Application Priority Data
Sep. 20, 2016   (DE) .................. 10 2016 117 681

(51) Int. Cl.
*B23Q 7/14*       (2006.01)
*B23Q 39/04*      (2006.01)
*B23Q 1/66*       (2006.01)

(52) U.S. Cl.
CPC .......... *B23Q 7/1431* (2013.01); *B23Q 39/04* (2013.01); *B23Q 1/66* (2013.01); *B23Q 2240/002* (2013.01)

(58) Field of Classification Search
CPC ......... B23Q 7/1431; B23Q 39/04; B23Q 1/66
USPC ..................................................... 198/346.1
See application file for complete search history.

(56) References Cited

U.S. PATENT DOCUMENTS

| | | | | |
|---|---|---|---|---|
| 4,890,371 A * | 1/1990 | Camloh | ............... | B08B 3/02 |
| | | | | 134/133 |
| 5,429,461 A * | 7/1995 | Mukherjee | ............ | B23Q 1/012 |
| | | | | 269/60 |
| 6,193,048 B1 * | 2/2001 | Keith | ................... | B23Q 7/1431 |
| | | | | 198/346.1 |
| 7,087,858 B2 * | 8/2006 | Egashira | ................ | B23K 26/08 |
| | | | | 219/121.82 |
| 7,721,398 B2 | 5/2010 | Bernhard et al. | | |
| 2003/0127440 A1 | 7/2003 | Egashira | | |
| 2006/0118384 A1 * | 6/2006 | Funakoshi | ........... | B23Q 1/0072 |
| | | | | 198/345.3 |

FOREIGN PATENT DOCUMENTS

| | | |
|---|---|---|
| DE | 10030997 A1 | 1/2001 |
| DE | 202011051331 U1 | 12/2011 |
| EP | 1747843 A1 | 1/2007 |
| EP | 3117955 B1 | 9/2017 |

* cited by examiner

*Primary Examiner* — William R Harp
(74) *Attorney, Agent, or Firm* — Fish & Richardson P.C.

(57) ABSTRACT

The invention relates to pallet changers and methods for processing sheet-like materials with at least two movably arranged pallets movably positioned in a main frame and having a support surface for receiving a sheet-like material. The pallets are moved in alternation with a drive from the main frame into a material processing machine and back to the main frame. The drive comprises a motor, which drives a drive element, which moves the pallets. A processing device is provided on the main frame to process sheet-like material positioned on the pallets in the main frame.

26 Claims, 9 Drawing Sheets

ABLE PALLET

CROSS-REFERENCE TO RELATED APPLICATION

This application claims priority to German Application No. DE 10 2016 117 681.8, filed on Sep. 20, 2016. The contents of this priority application are hereby incorporated herein by reference in their entirety.

TECHNICAL FIELD

The present disclosure relates to pallet changers for receiving a sheet-like material, and to methods for processing sheet-like materials arranged on moveable pallets.

BACKGROUND

US Patent Publication 2003/0127440 discloses a pallet changer associated with a processing machine, such as a laser-cutting machine. This pallet changer includes an upper and lower pallet, which are driven in alternation into the laser-cutting machine to process the sheet-like material resting on a support surface of the pallet. After the processing of the sheet-like material, the pallet is removed from the processing machine and is returned to the pallet changer, wherein the second pallet in the meantime has been loaded with a further sheet-like material and driven into the processing machine. By means of a pallet changer of this type, while the sheet-like material on a loaded pallet driven into the processing machine is being processed, the pallet located in the pallet changer is loaded with a sheet-like material for the subsequent processing operation. The sheet-like material already processed is driven out from the processing machine, and the pallet with the processed sheet-like material is unloaded and then loaded with a further sheet-like material to be processed.

The processing period of the sheet-like material in the processing machine, which is also referred to as the "primary processing time," takes more time than the unloading of the processed sheet-like material and the loading of a sheet-like material to be processed, which is also referred to as the "secondary working time." Due to the shorter secondary working time of the pallet changer compared to the primary processing time of the processing machine, there are many downtime periods at the pallet changer.

Additional processing steps are performed outside the pallet changer in separate process steps, such as the labelling or marking of the sheet-like material, the forming of holes, deburring, thread tapping, or the like. This requires space. If these additional processing operations are not performed in separate processing stations, but instead by the processing machine, the primary processing time is extended by these additional processing operations.

SUMMARY

The present disclosure relates to pallet changers with at least two moveable pallets and methods for processing a sheet-like material arranged on a moveable pallet, whereby the length of a processing cycle for processing the sheet-like material is optimized and shortened.

In one aspect, the present disclosure provides pallet changer systems. The pallet changer systems include a main frame and at least two pallets moveably positioned in the main frame. The at least two pallets each include a support surface for receiving a sheet-like material. The pallet changer systems include a drive system coupled to the main frame and configured to move the at least two pallets in alternation with one another from the main frame into a material processing machine positioned adjacent to the main frame and back into the main frame. The drive system includes a motor configured to actuate a drive element for movement of the at least two pallets into the material processing machine and back to the main frame. The pallet changer systems further include a processing device coupled to the main frame. The processing device is configured to process sheet-like material positioned on the support surface of one or more of the at least two pallets that is positioned in the main frame.

The processing device permits the sheet-like material resting on the pallet to be processed in the pallet changer via a control protocol that is distinct from the control protocol implemented for a processing machine for the sheet-like material. As a result, both a sheet-like material not yet processed can be processed in a preparatory manner for the subsequent processing operation in the processing machine, and a sheet-like material already processed by the processing machine or workpieces produced from said material once this/these has/have been guided out from the processing machine and the pallet is positioned in the pallet changer. The processing device provided on the pallet changer, which processing device is distinct from the processing machine, affords additional functions, such as the labelling or marking of the sheet-like material or of the workpieces, the forming of holes or deburring, thread tapping, or the like to be performed in a manner not interrupting the primary time, but instead during the secondary working time, so that these activities can be performed in parallel to the primary processing time. A shortening of the overall processing period and an optimization of the spatial requirement are thus made possible, since besides the pallet changer there can be no additional processing stations arranged upstream or downstream thereof.

In particular implementations, the processing device is configured to process the sheet-like material contemporaneously with at least a portion of processing by the material processing machine of sheet-like material positioned on the support surface of one or more of the at least two pallets that is positioned in the material processing machine by the drive system.

In certain implementations, the processing device has a processing tool, which is moveable at least in part within a support surface of the pallet. Processing of the material resting on the support surface of the pallet can thus be controlled over the entire area.

Depending on the flexibility and possibilities for use, the processing device can have a stationary or even a moveable linear axis. Alternatively, a bi-linear or tri-linear axis system can also be provided on the pallet changer.

In particular implementations, the processing device is configured as a linear axis moveable along a drive-in and drive-out direction of the pallet. This linear axis is moveable in the X direction. In particular implementations, A Y apparatus is provided movably on the processing tool on the linear axis. The processing head can thus be moved above the support surface of the pallet in a plane parallel thereto. The processing tool can also be received by the linear axis movably in the Z direction in some implementations. A height adjustment relative to the sheet-like material can thus be performed to enable an adaptation to different sheet thicknesses or processing requirements.

In particular implementations, the drive of the pallet changer controls the movement of the pallet from the main frame into the processing machine and back again, as well as a movement of the processing device along the main frame. The workpiece processing is optimized as a result. In addition, cost saving can be enabled, since the at least one drive is used jointly for the changing of the pallet and for the operation of the additional processing device.

The processing device is driven movably by a driver element. In certain implementations, the driver element is a switchable driver element, which is controlled by the drive that controls the drive-in and drive-out movement of the pallets. A reduction in the number of drives or motors can thus be made possible, so that one motor is sufficient for controlling the movement of the pallet and for controlling a movement of the processing device.

In particular implementations, the drive element driving the pallets and the driver element movably driving the processing device are driven by the same motor axis of the motor, and a switchable clutch is provided between the motor axis and the drive element or the motor axis and the driver element or in both cases. A selective control of the drive element and/or of the driver element can thus be made possible.

Furthermore, a drive wheel for the drive element and, adjacently, thereto a driver wheel for the driver element are provided on the same motor axis of the motor in some implementations. This enables a particularly compact design of the pallet changer.

A further embodiment of the pallet changer provides that two moveable pallets are received on a carrier of the main frame. These pallets are arranged one above the other in a starting position, and the carrier is moveable in the Z-direction relative to the main frame, so that one of the pallets received by the carrier is selectively positioned in a start position for being driven into/out from the processing machine. Here, the further pallet can be provided in an intermediate position or rest position. By means of the carrier moveable in the Z-direction, the pallets prepared for the subsequent processing phase or equipped with a sheet-like material can thus be brought into a drive-in position, and furthermore the carrier for receiving a pallet coming from the material processing machine can also be transferred into a receiving position, so that the pallets are driven in and out successively and in alternation.

The carrier in the main frame of the pallet changer consists of two longitudinal profiles formed separately from one another in particular implementations. The two longitudinal profiles each have running surfaces for the at least two pallets, by means of which running surfaces the pallets can be moved and can be guided. On the one hand, a simple drive-in and drive-out movement can thus be controlled. On the other hand, due to the guidance of the pallets via the running surfaces, there is no need for any further alignment elements to enable a secured positioning of the pallets as these are driven in and out and also in a starting position in the pallet changer for processing of the sheet-like material.

Further embodiments of the pallet changer provide that at least one first coupling element is arranged on the drive element and at least one further coupling element is arranged on each pallet, and as one pallet is moved into a drive-in position the further coupling element of said pallet engages with and is operatively connected to the first coupling element on the drive element, and the other pallet, which is moved into the intermediate position or rest position, is decoupled from the drive element. A quick change in the drive connection for driving the first or second or further pallet in and out can thus be provided.

In particular implementations, the first coupling element, which is provided on the drive element, is formed as a pin pointing towards the pallet, and the further coupling element arranged on the pallet can have a U-shaped guide, in/from which the pin is engaged or disengaged during a movement of the pallet in the Z-direction. Thus, merely a movement in the Z-direction is sufficient to change a drive connection from one pallet to another pallet.

Further embodiments of the invention provide that the lifting movement of the carrier relative to the main frame is controlled by a drive component arranged on the motor axis of the motor or coupled thereto. Furthermore, the number of drives in the case of this pallet changer as well as the installation space is thus reduced. The motor for the drive-in and drive-out movement of the pallet, which motor also controls the processing device, can also perform the lifting movement of the carrier at the same time.

In particular implementations, the drive element and the drive component are provided between the main frame and a left and right longitudinal side of the pallet, respectively, and are driven jointly by a motor axis extending over the width of the main frame. A control for the pallet with regard to the drive-in and drive-out movement and with regard to the change of position in the Z-direction within the pallet changer can thus be enabled in a simple manner. In addition, it is thus made possible for a space or region below the support surface of the corresponding pallet in the pallet changer to be kept free, so that the processing with the processing device can be designed in a flexible manner.

The processing tool of the processing device is configured as a material-removing tool, in accordance with particular implementations. Here, the processing can be performed by means of a cutting beam, for example a laser beam. Furthermore, further tools for machining or removing surface structures or the like can be provided. In particular, the processing tool is intended to carry out additional functions, such as engraving or marking, in particular by means of a laser beam, deburring, drilling, thread tapping, or countersinking.

In another aspect, the present disclosure provides methods for processing a sheet-like material arranged on a moveable pallet, in which methods the sheet-like material resting on the pallet is processed in the pallet changer by at least one processing device, before or after the processing of the sheet-like material in the processing machine, and is controlled independently of a processing in the processing machine. The pallet changer times, which also include the loading and unloading both of the unprocessed and processed sheet-like material, are shorter than the primary processing times of the sheet-like material resting on the pallets in the processing machine. The previous downtime in the pallet changer can now be used for additional processing steps, so that a shortening of the overall processing time is made possible.

In particular implementations, the processing device has at least one linear axis, which, for processing of the sheet-like material resting on the pallet, is moved in the pallet changer along the main frame of the pallet changer and is controlled independently of the processing machine. The pallet changer can thus work self-sufficiently and can perform additional functions.

The pallet or the processing tool of the processing device are moved along a Z-axis or both relative to one another, in accordance with certain implementations. The processing tool can thus be positioned at a predetermined and suitable distance from the sheet-like material. At the same time, an adaptation to sheet-like materials of different thickness can be made.

In some implementations, a further embodiment of the methods provide the following sequence: A sheet-like material resting on the pallet in the pallet changer is processed by the processing device. This sheet-like material is then driven into the processing machine so as to perform there the primary processing, for example punching, cutting, bending, countersinking, or the like. The further pallet in the pallet changer is loaded and then moved into a processing position in the pallet changer and processed by the processing device. The further pallet in the pallet changer is then moved into an intermediate position or rest position, provided this has not already been assumed, so that the pallet with the processed sheet-like material, which comprises the at least one workpiece and/or sheet skeleton, can be guided from the processing machine back into the pallet changer. The further pallet is then moved from the intermediate position or rest position into a drive-in position for being driven into the processing machine. The pallet with the processed sheet-like material now disposed in the pallet changer is then subjected to a secondary processing by the processing device or is immediately unloaded. This can take place in the rest position, drive-in position, or intermediate position of the pallet within the main frame. This process cycle then starts over again.

The disclosure and further advantageous embodiments and developments thereof will be explained and described in greater detail hereinafter on the basis of the examples depicted in the drawings. The features to be inferred from the description the drawings can be applied in accordance with the invention individually or together in any combination.

DETAILED DESCRIPTION

Figure 1:
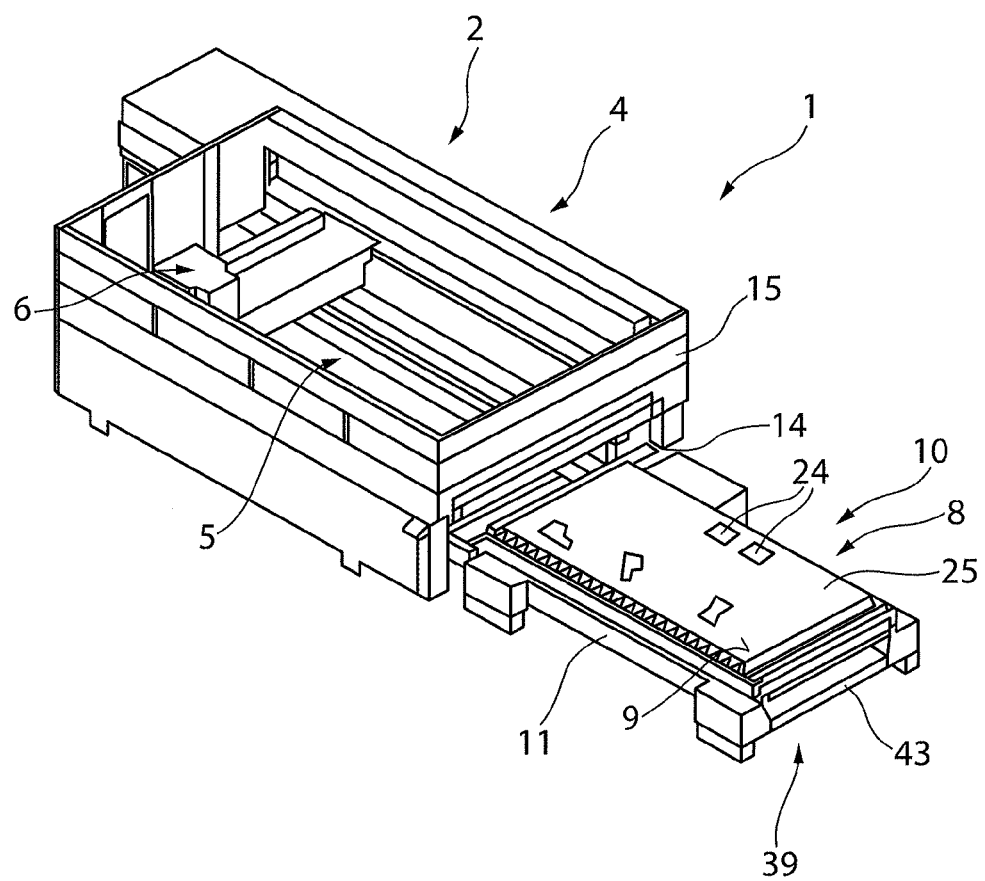
FIG. 1 shows a perspective view of a processing facility.

FIG. 1 depicts a perspective view of a processing facility 1 for separating sheet-like materials 8 that are made of metal. This processing facility comprises a material processing machine 2, which in the shown example is a laser-cutting machine 2, which will be explained in greater detail in FIG. 2. The processing facility 1 could alternatively also comprise a plasma-cutting machine or punching and laser-cutting combination machine. The material processing machine 2 is surrounded by a housing 4. A processing station 5 is provided within the housing 4, in which processing station a cutting unit 6 with at least one laser-cutting head 7 (FIG. 2) is moveable within a horizontal movement plane. Outside the housing 4 there is provided a loading and unloading station 10. This loading and unloading station 10 is formed by what is known as a pallet changer 39 in accordance with particular embodiments. The pallet changer 39 comprises at least two moveable pallets 11, 43. In addition, and not depicted in greater detail, a handling apparatus is associated with the loading and unloading station 10, by means of which handling apparatus a sheet-like material 8 in unprocessed form, i.e., as raw material, is placed on the pallet 11, before the pallet 11 is moved into the processing station 5. The sheet-like material 8 is then processed to produce workpieces 24, in particular product parts, wherein at the same time leftover parts and/or a sheet skeleton 25 are also produced. The processed sheet-like material 8 is then moved into the loading and unloading station 10 by means of the pallet 11, so that the processed sheet-like material 8 or the workpieces 24 and the sheet skeleton 25 can be removed from the pallet 11 by the handling device.

The pallet 11 is driven into and out of the housing 4 through an opening 14. The opening 14 can be closed by a closure element 15 (not depicted in greater detail), such as a door or a flap, and is opened during the movement of the pallet 11, 43.

Figure 2:
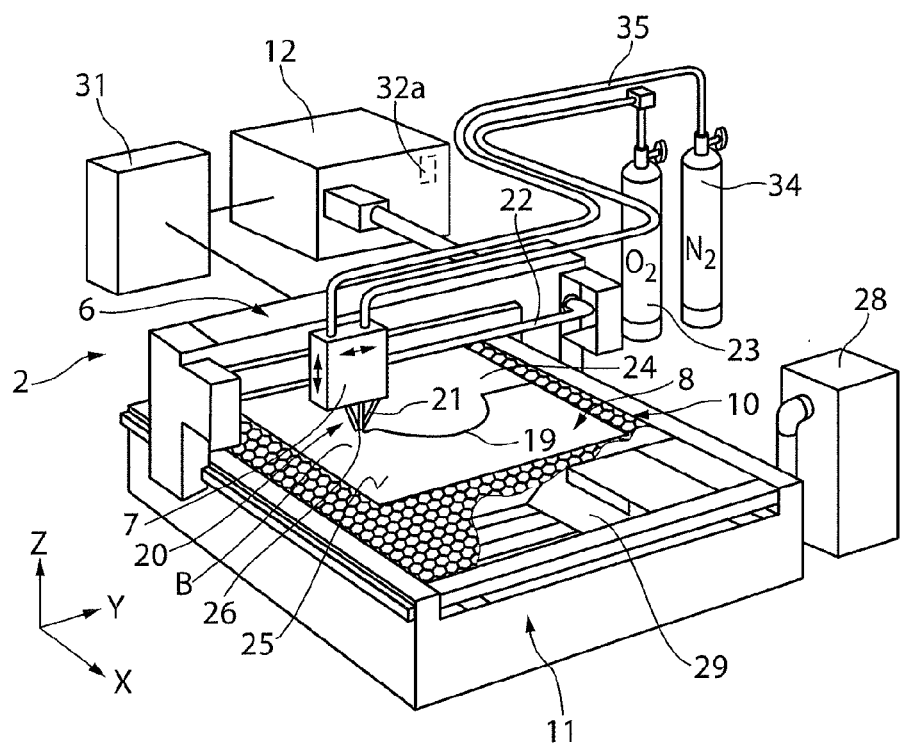
FIG. 2 shows a perspective view of a processing machine.

FIG. 2 shows a perspective view of the processing machine as a laser-cutting machine 2. This is, for example, a $CO_2$ laser-cutting machine with a $CO_2$ laser source 12. A laser beam 21 generated by the laser source 12 is guided by means of a beam guide 22 from deflection mirrors (not depicted in greater detail) to the laser-cutting head 7 and is focused therein. The laser beam 21 is then oriented by a cutting nozzle 20 at right angles to the surface of a sheet-like material 8. The beam axis (optical axis) of the laser beam 21 runs at right angles to the surface of the sheet-like material 8. The laser beam 21 acts on the sheet-like material 8 at the process location B jointly with a process gas beam 26. Alternatively, the laser-cutting machine 2 can have a solid-state laser as laser source, the radiation of which is guided with the aid of a fiber-optic cable to the laser-cutting head 7.

For laser cutting the sheet-like material 8, the material is firstly pierced by the laser beam 21 with a process gas beam 26 also being supplied. The laser beam 21 is then moved over the sheet-like material 8, so that a continuous cutting gap 19 is produced, at which the laser beam 21 cuts through the sheet-like material 8. This results in at least one cut-out workpiece 24 in the sheet skeleton 25.

The particles and gases produced during the piercing and laser cutting can be sucked up with the aid of a suction device 28 from a suction chamber 29.

The laser-cutting machine 2 and/or the processing facility 1 are/is controlled via a machine control device 31. By way of example, the machine control device 31 controls the piercing process and takes on the further control tasks of the laser-cutting machine 2 for forming the cutting gap 19. The machine control device 31 is connected to a laser control device 32 for signal exchange therewith, which laser control device is typically integrated in the laser source 12.

Figure 3:
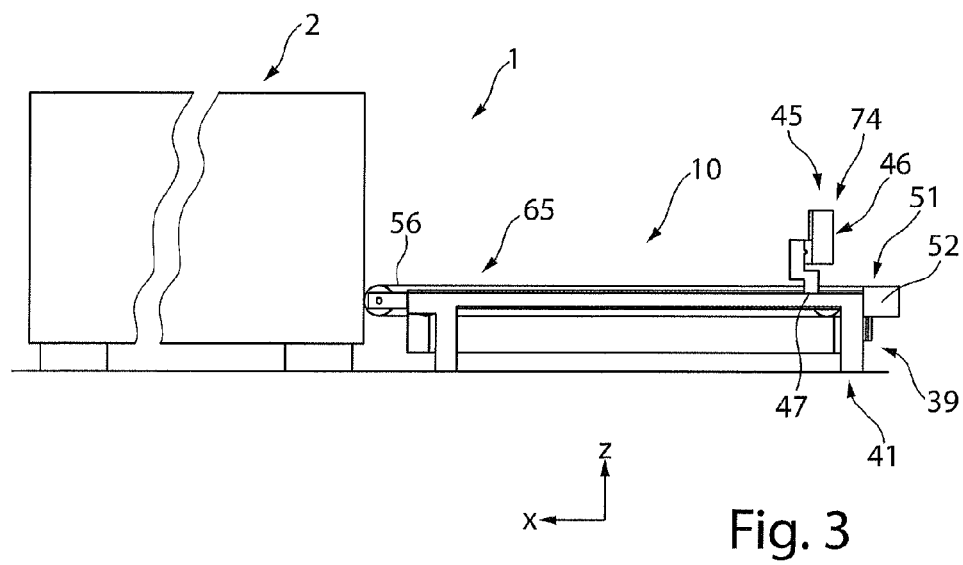
FIG. 3 shows a schematic side view of the processing facility according to FIG. 1.
Figure 4:
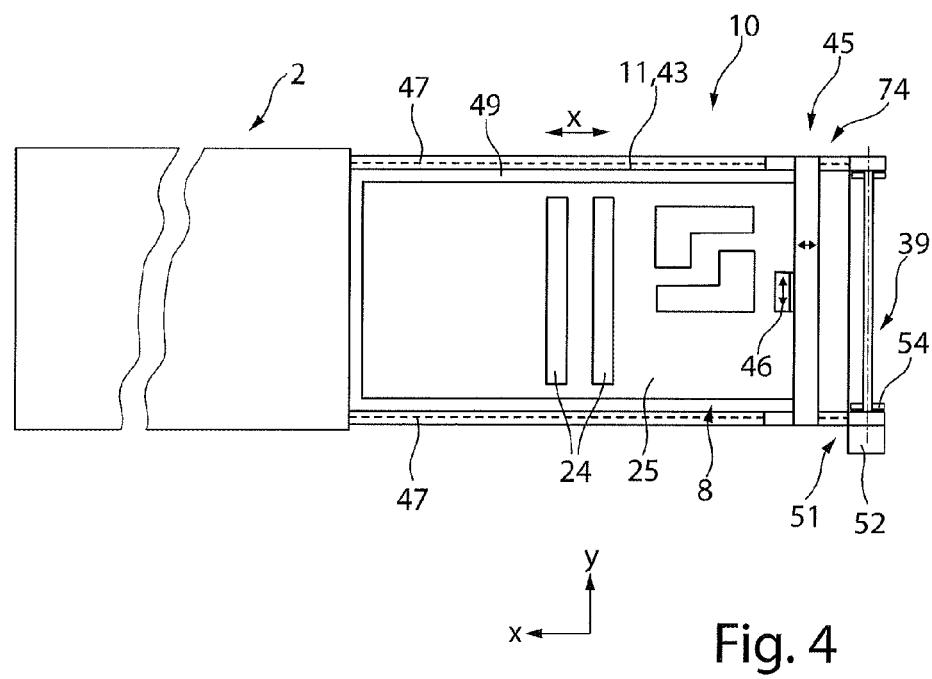
FIG. 4 shows a schematic view of the processing facility according to FIG. 1 from above.

FIG. 3 shows a schematic side view, and FIG. 4 shows a schematic top view of the processing facility 1, in which the pallet changer 39 is associated with the processing machine 2 in the loading and unloading station 10. This pallet changer 39 comprises a main frame 41, which receives a carrier 42 (FIG. 7), which is moveable in the Z-direction relative to the main frame 41. This carrier 42 receives a first pallet 11 and a further pallet 43, wherein these are arranged directly one above the other in a starting position 63, as is illustrated in FIG. 3. The pallet 11 is arranged in a drive-in position 65 in the main frame 41, and the pallet 43 is arranged in a rest position 68 in the main frame 41. The pallets 11, 43 are received movably in the horizontal by a carrier 42, and in certain embodiments the pallets 11, 43 have roller or slider elements 76 (FIG. 7), so that they can be driven into and out from the material processing machine 2 from the pallet changer 39.

The pallet changer 39 has a processing device 45, which carries a processing tool 46. This processing device 45 by way of example can be formed by at least one moveable linear axis, which is moveable in particular in the X-direction along a guide 47, a linear guide in particular implementations, which is provided on the main frame 41. The processing tool 46 is moveable in the Y-direction along the linear axis, in particular embodiments. The processing tool 46 advantageously can also be provided on the at least one linear axis movably in the Z-direction. The processing device 45 is depicted in a rest position 74 in FIGS. 3 and 4.

The processing device 45 has a workspace corresponding to a support surface 49 of the pallet 11, 43 for receiving the sheet-like material 8.

The processing tool 46 of the processing device 45 is provided for what are known as additional functions, e.g., for processing operations such as engraving, marking or labelling, or also material-removing machining operations, which are performed additionally or in a supplementary manner to the processing of the sheet-like material 8 in the processing station 5 of the material processing machine 2. The processing tool 46, however, is not limited to this function, and instead can also have a cutting head four a cutting beam processing operation, for example by a laser beam, plasma beam, or the like.

Figure 5:
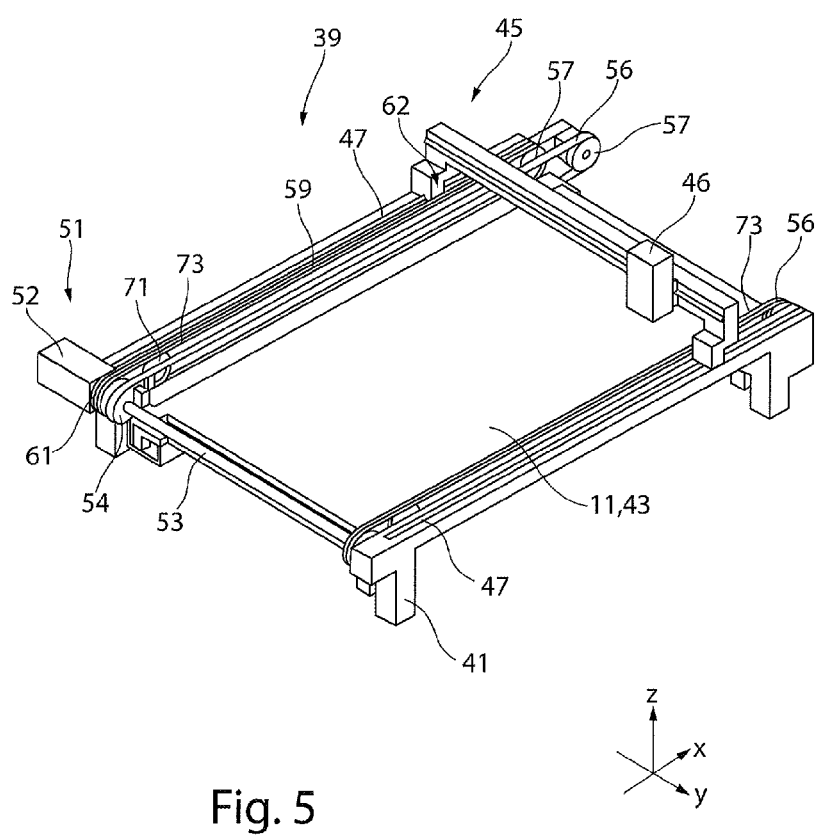
FIG. 5 shows a perspective view of a pallet changer.
Figure 6:
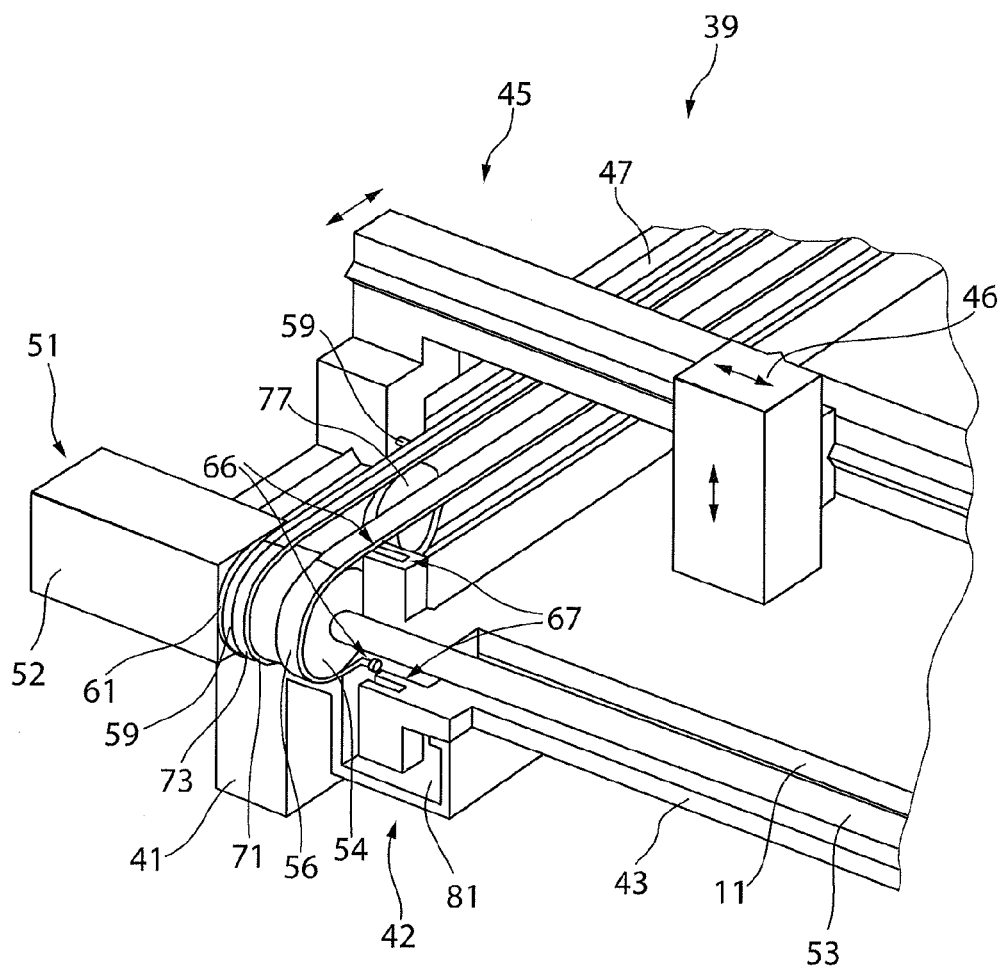
FIG. 6 shows a schematically enlarged view of a corner region of the pallet changer according to FIG. 5.

FIG. 5 depicts a perspective view of the pallet changer 39. A drive 51 is positioned at one end region of the main frame 41. This drive 51 comprises a motor 52, which receives at least one drive wheel 54 on its motor drive shaft 53 to drive a drive element 56, such as a belt or a chain. The drive element 56 is guided between the drive wheel 54 and a counter wheel 57 arranged opposite. The pallets 11, 43 are driven into and out from the material processing machine 2 by means of this drive element 56.

A driver element 59 is positioned parallel to the drive element 56 and is guided on the one hand by a driver wheel 61 and opposite thereto by a further counter wheel 57, in accordance with particular implementations. The driver element 59 can be designed as a chain, belt or the like. The driver wheel 61 is arranged on the motor drive shaft 53 of the motor 52, in accordance with particular implementations. This is positioned directly adjacently to the drive wheel 54. The driver element 59 is coupled by a driver 62 to the processing device 45, which driver can be switchable and can be selectively coupled to the processing device 45, so that a movement of the driver element 59 controls a movement of the processing device 45. The driver 62 can be designed as a pin and can act or engage on a support of the processing device 45.

A switchable clutch 60 (FIGS. 7 to 9) is provided between the drive wheel 54 and the motor drive shaft 53 or between the driver wheel 61 and the motor drive shaft 53 or in both cases, so that the drive wheel 54 and/or the driver wheel 61 are/is selectively driven in rotation by the same motor 52. By way of example, the processing device 45 can first be controlled movably relative to the main frame 41 to carry out a processing of the sheet-like material 8. Following completion of the processing step, the drive wheel 54 can then be controlled to drive the pallet 11, 43 into the material processing machine 2 or out from the material processing machine 2.

Figure 7:
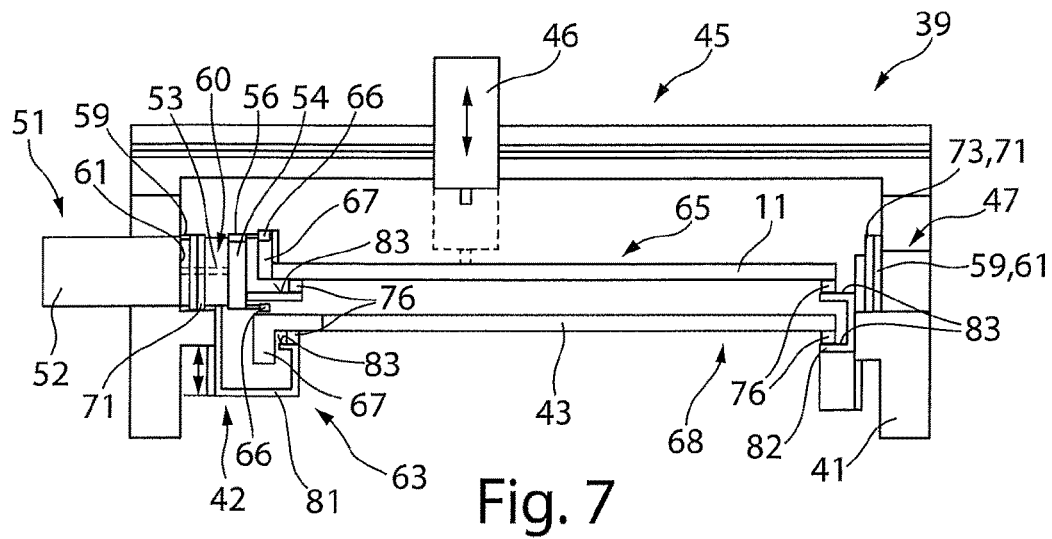
FIG. 7 shows a schematic front view of the pallet changer with a carrier in a first lifting position.
Figure 8:
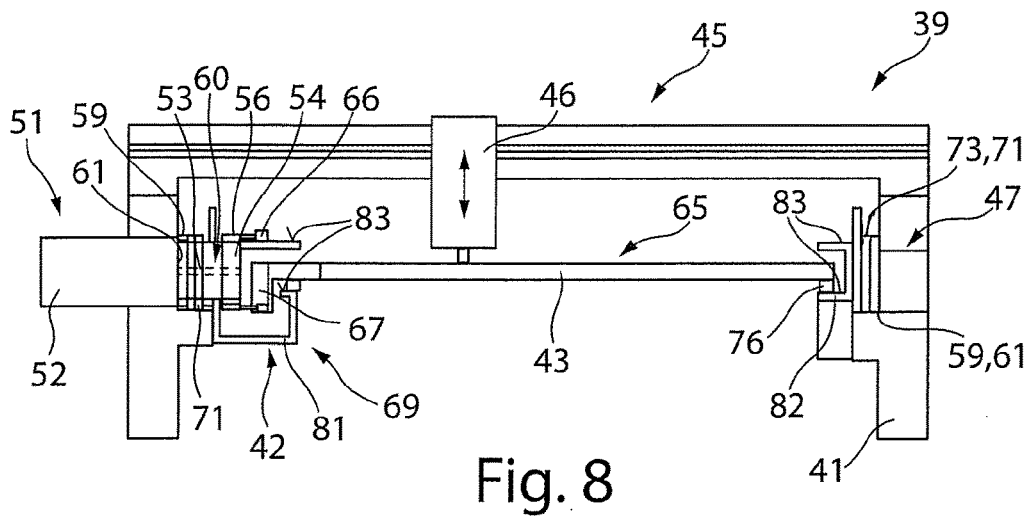
FIG. 8 shows a schematic front view of the pallet changer with the carrier in a second lifting position.
Figure 9:
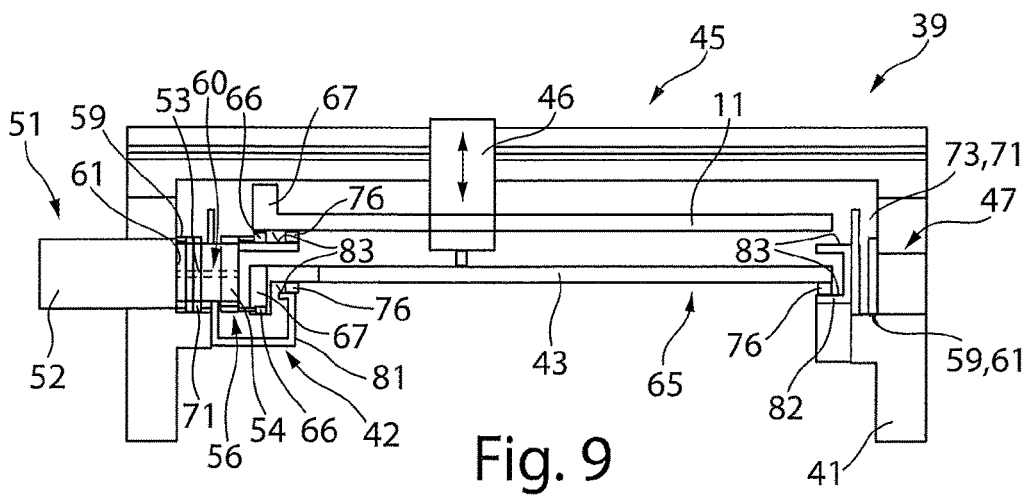
FIG. 9 shows a schematic front view of the pallet changer with the carrier in a further process step compared to FIG. 8 in the second lifting position.

Schematic front views of the pallet changer 39 according to FIG. 5 are depicted in FIGS. 7 to 9. The carrier 42 in accordance with FIG. 7 is in a starting position, and in accordance with FIG. 8, is in an upper lifting position with the upper pallet 11 already driven into the material processing machine 2. The carrier 42 is arranged in accordance with FIG. 9 in an upper position or lifting position.

A first coupling element 66 is provided on the drive element 56 and, for example, is designed as a pin. This first coupling element 66 cooperates with a second coupling element 67, which is arranged on the pallet 11, 43. In a starting position 63, this is arranged pointing towards the first coupling element 66. This second coupling element 67 is, for example, designed as a U-shaped guide. The U-shaped guide extends in the Z-direction.

In a starting position of the drive element 56, the drive element 56 has a first coupling element 66 on each of an upper branch and a lower branch, which coupling elements lie in a common Z-axis. In various implementations, these two coupling elements 66 are positioned close to the drive wheel 54. In a starting position 63 of the carrier 42, in which the pallets 11, 43 are both arranged congruently one above the other in the carrier 42, the second coupling elements 67 of the pallets 11, 43 arranged one above the other, also lie oriented in a common Z-axis. Here, the position of the Z-axis in relation to the X-direction of the first coupling elements 66 corresponds to that of the second coupling elements 67. In accordance with FIG. 7, with the arrangement of the carrier 42 in a starting position 63, the first coupling element 66 arranged on the upper branch thus engages in the second coupling element 67 of the pallet 11, and an operative connection is provided. At the same time, the first coupling element 66 on the lower branch of the drive element 56 is disengaged from the second coupling element 67 on the pallet 43. In the case of the operative connection depicted in FIG. 7 between the drive element 56 and the pallet 11, the pallet is driven into the material processing machine 2 when the drive wheel 54 is driven by the motor 52. The further pallet 43 remains resting on the carrier 42.

The pallet 11 is arranged in accordance with FIG. 7 in a drive-in position 65, which lies in a plane in which the pallet 11 can be driven into the material processing machine 2. The pallet 43 is positioned in a lower rest position 68.

In this drive-in position 65 of the pallet 11, the sheet-like material 8 resting on the pallet 11 can, for example, be processed.

The carrier 42 in the main frame 41 of the pallet changer 39 consists, for example, of two longitudinal profiles 81, 82, which run separately from one another along the main frame 41. In accordance with exemplary embodiments, the longitudinal profiles 81, 82 are formed in a manner deviating from one another as considered in cross-section. They can also be formed identically. A running surface 83 is provided on each of the longitudinal profiles 81, 82, on which roller elements 76 of the pallet 11, 43 can be moved or can roll. The running surface 83 has a guide on one of the two longitudinal profiles 81, 82 or on both longitudinal profiles 81, 82, for example a guide groove or a guide channel, so as to guide the pallets 11, 43 as they are driven in and out. The roller elements 76 can be designed as radial bearings or the like.

The longitudinal profile 81 is larger than the longitudinal profile 82 in cross-section, so that the coupling elements 67 can be arranged on the pallet 11, 43 and can cooperate with the coupling elements 66. The longitudinal profile 81 associated with the coupling elements 66, 67 has a G-shaped cross-section. The longitudinal profile 82 arranged opposite the longitudinal profile 81 is C-shaped in certain embodiments.

To drive the pallet 43 into the processing machine 2, the carrier 42 is moved into the upper position 69 or upper lifting position 69 according to FIG. 8, so that the pallet 43 is positioned in the plane for being driven into the processing machine 2. Due to the vertical movement of the carrier 42 along the Z-axis, the operative connection between the first coupling element 66 on the upper branch of the drive element 56 and the second coupling element 67 on the pallet 11 becomes disengaged, and at the same time an operative connection is established between the first coupling element 66 of the lower branch of the drive element 56 and the second coupling element 67 of the pallet 43. The pallet 43 can then be driven into and out from the material processing machine 2.

Before the pallet 43 is driven in, a processing operation can be performed by the processing device 45. Once this processing operation has been performed, the carrier 42 is moved again along the Z-axis into a lower position or starting position 63, so that the pallet 11 with the processed sheet-like material resting thereon can be driven from the processing machine 2 into the pallet changer 39.

The carrier 42 is then transferred again into the upper lifting position 69, so that the lower pallet 43 is then in the drive-in position 65 and can be driven into the processing machine 2. The carrier 42 is then lowered again into the starting position to start the unloading process of the pallet 11.

Figure 10:
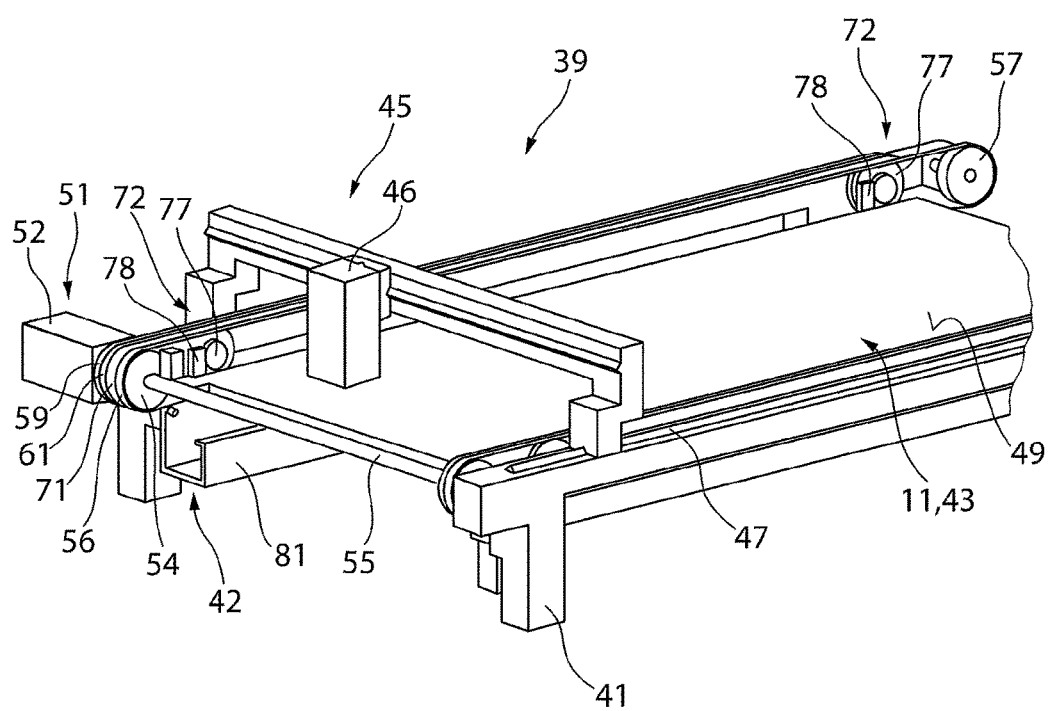
FIG. 10 shows a schematic side view of the pallet changer according to FIG. 5.

The movement of the carrier 42 in the Z-direction can be performed, for example, via a lifting device controllable separately. The separately controllable lifting device, in accordance with an embodiment not depicted in greater detail, can be provided in the form of lifting cylinders, which are each positioned beneath the carrier 42 and control the movement. A drive device 70 can be provided and can be controlled by the motor 52. By way of example, this drive device 70 can have a gearwheel 71, which is arranged on the motor drive shaft 53 and drives a further drive element 73, such as a toothed belt, a chain, or the like. This drive element 73 can drive a gear unit 72. This gear unit 72 for example can be designed as a gearwheel 77 mounted on the main frame 41 and a toothed rack 78 associated with this gearwheel 77, wherein the toothed rack 78 is arranged fixedly on the carrier 42 or the longitudinal profiles 81, 82. In particular embodiments, a gear unit 72 of this type is provided in the corresponding corner region of the pallet 11, 43, so that a uniform and tilt-free movement of the pallet 11, 43 is made possible. An arrangement of this type is illustrated schematically and by way of example in the side view in FIG. 10. The gearwheel 71 is provided by a switchable clutch 60 on the motor drive shaft 53.

FIGS. 11A to 11F depict schematic side views of the processing machine 2 with the pallet changer 39 in a side view. These FIGS. 11A to 11F show successive method steps of an example of a process cycle for processing the sheet-like material.

Figure 11A:
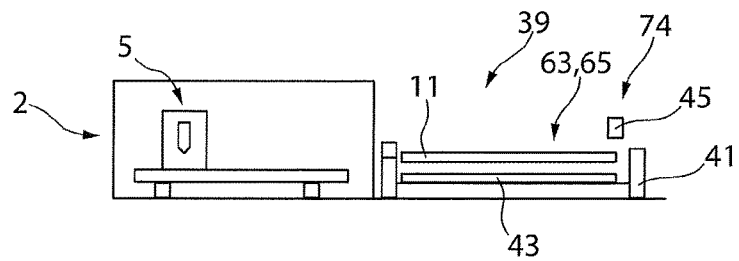
FIGS. 11A, 11B, 11C, 11D, 11E, and 11F show schematic views for the sequence of method steps for processing a sheet-like material.

As shown in FIG. 11A, the pallet changer 39 receives the pallets 11, 43, wherein the carrier 42 is arranged in a starting position 63 according to FIGS. 3 and 7. An unprocessed sheet-like material 8 is placed on the pallet 11. The sheet-like material 8 is then processed by means of the processing device 45. By way of example, a marking of the sheet-like material 8, in particular a laser engraving for permanently labelling and identifying the workpieces 24, can be performed. The processing device 45 is then moved back into a rest position 74.

Figure 11B:
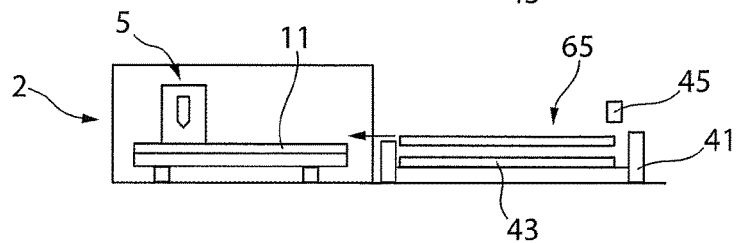

As shown in FIG. 11B, the pallet 11 is then driven into the processing machine 2. A subsequent sheet-like material 8 is then placed on the pallet 43, wherein this pallet 43 can be arranged both in the rest position 68 (FIG. 7) and in a drive-in position 65 (FIG. 8). The sheet-like material 8 on the pallet 11 driven into the processing machine 2 is processed in the processing station 5.

Figure 11C:
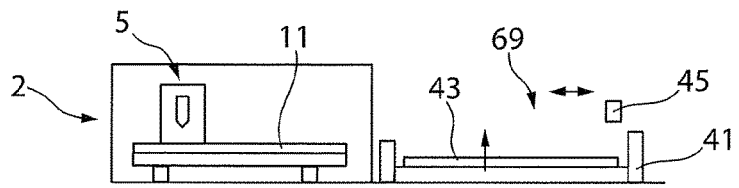

As shown in FIG. 11C, in parallel, the sheet-like material 8 on the pallet 43 can be processed by the processing device 45.

Figure 11D:
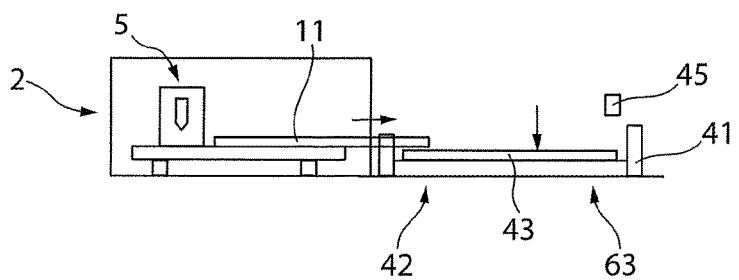

As shown in FIG. 11D, once the processing of the sheet-like material 8 in the pallet changer 39 is complete, the carrier 42 is returned to the starting position 63, provided this had been moved for the processing, so that the pallet 11 is guided out from the material processing machine 2 and is received by the carrier 42.

Figure 11E:
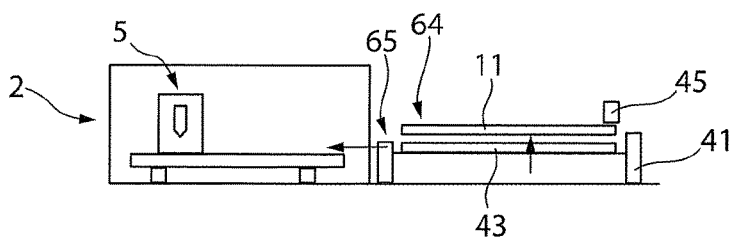

As shown in FIG. 11E, the carrier 42 is then moved into an upper position 69 according to FIG. 9, so that the pallet 43 is in the drive-in position 65 and can be driven into the material processing machine 2.

Figure 11F:
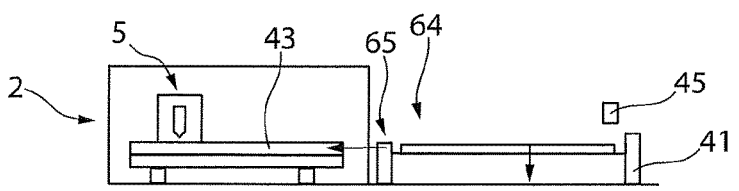

As shown in FIG. 11F, the sheet-like material 8 on the pallet 43 is then processed in the material processing machine 2. The sheet-like material 8 already processed or the one or more workpieces 24 and/or the sheet skeleton 25 on the pallet 11 can be subjected to secondary processing by the processing device 45. Alternatively, the processed sheet-like material, in particular the one or more workpieces 24 and/or the sheet skeleton 25 can be removed from the pallet 11 so as to be stored on a storage pallet or in a temporary store or can be transferred to a further processing station. Here, the carrier 42 can be arranged both in a starting position 63 and in an upper position 69.

Figure 12:
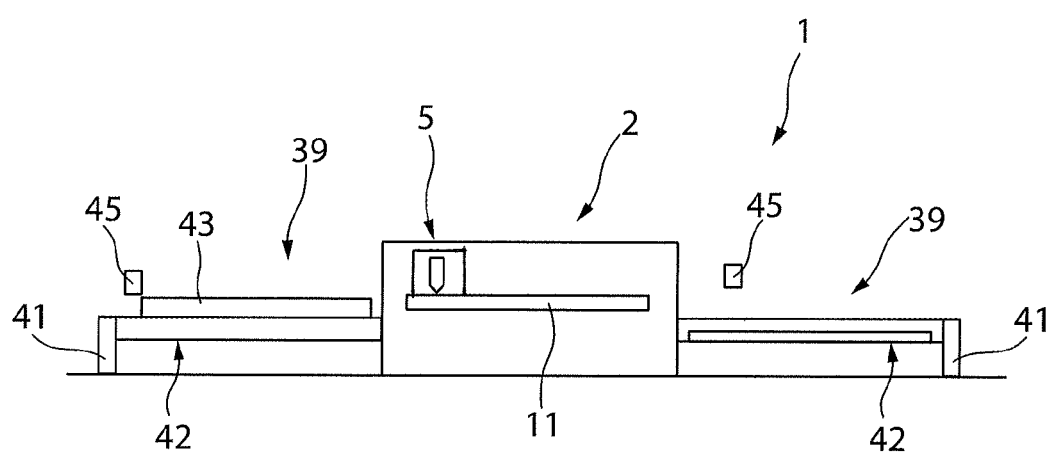
FIG. 12 shows a schematic side view of an alternative embodiment of the processing facility according to FIG. 3.

FIG. 12 depicts an alternative construction of a processing facility 1. Here, a pallet changer 39 is provided on either side of the processing machine 2. This makes it possible for different additional functions to be performed in each pallet changer 39, so that the processing scope and the possibilities for processing the sheet-like material 8 can be extended as a result. By way of example, the sheet-like material 8 can be driven into the material processing machine 2 so as to be processed therein after a pre-processing, for example by a processing device 45, in the left pallet changer 39. This at least partially processed sheet-like material 8 is then driven out and into the right pallet changer 39 so as to perform a further processing, for example thread tapping or thread shaping or preparatory work, so as to then guide the pallet 11 back again into the material processing machine 2, so that further processing can be performed. The pallet 11 from the right pallet changer 39 can also be guided through directly to the left pallet changer 39, or the pallet 11 can also be unloaded in the right pallet changer 39.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A pallet changer system, the pallet changer system comprising;
a main frame;
at least two pallets moveably positioned in the main frame, wherein the at least two pallets each comprise a support surface for receiving a sheet-like material;
a drive system coupled to the main frame and configured to move the at least two pallets in alternation with one another from the main frame into a material processing machine positioned adjacent to the main frame and back into the main frame, wherein the drive system comprises a motor configured to actuate a drive element for movement of the at least two pallets into the material processing machine and back to the main frame; and
a processing device coupled to the main frame, wherein the processing device is configured to process sheet-like material positioned on the support surface of one or more of the at least two pallets that are positioned in the main frame
wherein the processing device has a processing tool that is moveable at least in part within the support surface of the one or more of the at least two pallets and wherein the processing device rests on a guide extending along a linear axis defining an X-direction, wherein the processing device is moveable in the X-direction on the guide and along the linear axis for a drive-in and a drive-out movement of the one or more of the at least two pallets and on which the processing tool moveable in a Y-direction is provided, wherein the Y-direction is orthogonal to the X-direction in a plane parallel to the one or more of the at least two pallets.

2. The pallet changer system of claim 1, wherein the processing device is configured to process the sheet-like material contemporaneously with at least a portion of processing by the material processing machine of a sheet-like material positioned on the support surface of one or more of the at least two pallets that is positioned in the material processing machine by the drive system.

3. The pallet changer system of claim 1, wherein the processing tool moveable in the Y-direction is also moveable in the Z-direction, wherein the Z-direction is vertical to the plane.

4. The pallet changer system of claim 1, wherein the drive system controls a movement of the pallet from the main frame into the material processing machine and back again and a movement of the processing device along the main frame.

5. The pallet changer system of claim 1, wherein the processing device is driven movably by at least one of a driver element, a switchable driver element, and the motor of the drive system.

6. The pallet changer system of claim 5, wherein the drive element and the driver element are driven by a shared motor drive shaft of the motor, and a switchable clutch is provided between the motor drive shaft and the drive element.

7. The pallet changer system of claim 5, wherein a drive wheel for the drive element is provided on the shared motor drive shaft of the motor, and adjacently thereto, a driver wheel for the driver element is provided on the motor drive shaft.

8. The pallet changer system of claim 1, wherein the at least two moveable pallets are positioned on a carrier of the main frame, the at least two moveable pallets being positioned one above the other in the carrier in a starting position, wherein the carrier is moveable in the Z-direction relative to the main frame, so that one pallet of the at least two moveable pallets is positioned selectively in a drive-in position for driving the one pallet into and out of the material processing machine, and a further pallet of the at least two moveable pallets is in an intermediate position or rest position.

9. The pallet changer system of claim 8, wherein the carrier consists of two longitudinal profiles formed separately from one another, wherein each longitudinal profile has running surfaces for the at least two pallets, whereby each pallet in the at least two pallets is moveable and is guided.

10. The pallet changer system of claim 8, wherein the carrier is moveable by a lifting movement relative to the main frame by at least one of the motor and a drive element arranged on the motor drive shaft.

11. The pallet changer system of claim 1, wherein at least one first coupling element is provided on the drive element and at least one further coupling element is provided on each pallet in the at least two pallets, wherein while one pallet is being moved into the drive-in position or after such a movement, the first coupling element is engaged with the further coupling element of the one pallet and is disengaged from a further pallet of the at least two moveable pallets.

12. The pallet changer system of claim 11, wherein the first coupling element arranged on the drive element is designed as a pin pointing towards the one pallet, and the further coupling element arranged on the one pallet is configured as a U-shaped guide, from which the pin is engaged and/or disengaged.

13. The pallet changer system of claim 12, wherein the first coupling element is configured to engage and/or disengage from the one pallet when the one pallet moves in the Z-direction.

14. The pallet changer system of claim 11, wherein the drive element and a drive device are provided between the main frame and a left and right longitudinal side of the one pallet respectively and are driven by a motor drive shaft extending over the width of the main frame.

15. The pallet changer system of claim 1, wherein a processing tool of the processing device is a material-removing tool.

16. A method for processing sheet-like materials comprising:
positioning a sheet-like material on a support surface of each pallet of at least two pallets moveably coupled to a main frame of a pallet changer system;
driving one pallet of the at least two pallets from the pallet changer system into a material processing machine positioned adjacent to the main frame for material processing of the sheet-like material positioned on the one pallet, wherein the one pallet is driven out from the material processing machine after the sheet-like material on the one pallet is processed and is fed back into the pallet changer system;
processing the sheet-like material positioned on one or more pallets of the at least two pallets other than the one pallet via at least one processing device coupled to the main frame; and
processing the sheet-like material positioned on the one pallet via the at least one processing device at least one of before and after material processing of the sheet-like material positioned on the one pallet by the material processing machine.

17. The method of claim 16, wherein processing the sheet-like material positioned on one or more pallets of the at least two pallets other than the one pallet comprises processing the sheet-like material during at least a portion of material processing of the sheet-like material positioned on the one pallet by the material processing machine, wherein the at least one processing device is controlled separately from the material processing machine.

18. The method of claim 16, wherein the processing device has a guide extending along at least one axis, the processing device moved along the main frame of the pallet changer for processing of the sheet-like material on the pallet in the pallet changer and at least one processing tool arranged on the linear axis is controlled.

19. The method of claim 16, wherein a distance between a respective pallet of the at least two pallets and the processing device is set by moving one with respect to the other or by moving both and wherein the respective pallet and the processing device are moved relative to one another along a Z-axis of the processing device for positioning of the sheet-like material on the respective pallet in relation to the processing tool depending on a selection of the processing tool and/or the material thickness of the sheet-like material.

20. The method of claim 16, further comprising driving the one or more pallets of the at least two pallets other than the one pallet into the material processing machine after the sheet like material positioned on the one or more pallets of the at least two pallets other than the one pallet is processed via the processing device in the main frame.

21. The method of claim 16, further comprising moving a further pallet of the at least two pallets in the pallet changer system into at least one of an intermediate position and a rest position, wherein the one pallet with the processed sheet-like material is guided out from the material processing machine into the pallet changer.

22. The method of claim 21, further comprising:
moving the further pallet from the intermediate position or the rest position into a drive-in position for being driven into the processing machine; and
driving the further pallet from the drive-in position into the material processing machine.

23. The method of claim 16, further comprising at least one of:
secondarily processing the one pallet with the processed sheet-like material, which comprises at least one workpiece and/or sheet skeleton, via the processing device coupled to the main frame in the pallet changer system after the one pallet is fed back into the pallet changer system; and
removing the processed sheet-like material from the one pallet.

24. A pallet changer system, the pallet changer system comprising;
a main frame;
at least two pallets moveably positioned in the main frame, wherein the at least two pallets each comprise a support surface for receiving a sheet-like material;
a drive system coupled to the main frame and configured to move the at least two pallets in alternation with one another from the main frame into a material processing machine positioned adjacent to the main frame and back into the main frame, wherein the drive system comprises a motor configured to actuate a drive element for movement of the at least two pallets into the material processing machine and back to the main frame; and
a processing device coupled to the main frame, wherein the processing device is configured to process sheet-like material positioned on the support surface of one or more of the at least two pallets that are positioned in the main frame,
wherein the drive system controls a movement of the pallet from the main frame into the material processing machine and back again and a movement of the processing device along the main frame, and wherein drive system controls the movement of pallet independently of the movement of the processing device.

25. The pallet changer system of claim 24, wherein the processing device is configured to process the sheet-like material contemporaneously with at least a portion of processing by the material processing machine of a sheet-like material positioned on the support surface of one or more of the at least two pallets that is positioned in the material processing machine by the drive system.

26. The pallet changer system of claim 24, wherein the processing device has a processing tool that is moveable at least in part within the support surface of the one or more of the at least two pallets.

* * * * *